(12) United States Patent
Jones et al.

(10) Patent No.: US 8,860,255 B2
(45) Date of Patent: Oct. 14, 2014

(54) SATURATION CONTROL UNIT FOR AN INTERPHASE TRANSFORMING UNIT AND PWM CONTROL APPARATUS FOR A VOLTAGE CONVERTING DEVICE

(75) Inventors: Rodney Jones, Stoke on Trent (GB); Jan Sundvall, Svenstrup (DK)

(73) Assignee: Siemens Aktiengesellschaft, Munich (DE)

( * ) Notice: Subject to any disclaimer, the term of this patent is extended or adjusted under 35 U.S.C. 154(b) by 528 days.

(21) Appl. No.: 13/318,533

(22) PCT Filed: Sep. 25, 2009

(86) PCT No.: PCT/EP2009/062456
§ 371 (c)(1),
(2), (4) Date: Nov. 2, 2011

(87) PCT Pub. No.: WO2010/127721
PCT Pub. Date: Nov. 11, 2010

(65) Prior Publication Data
US 2012/0049835 A1   Mar. 1, 2012

Related U.S. Application Data

(60) Provisional application No. 61/176,278, filed on May 7, 2009.

(51) Int. Cl.
*H01F 27/42* (2006.01)
(52) U.S. Cl.
USPC .......................................................... 307/104

(58) Field of Classification Search
USPC .......................................................... 307/104
See application file for complete search history.

(56) References Cited

U.S. PATENT DOCUMENTS

| 4,802,079 A | 1/1989 | Mizoguchi |
| 5,407,027 A | 4/1995 | Suzuki |
| 2005/0035751 A1* | 2/2005 | Kang et al. ................. 324/117 R |

FOREIGN PATENT DOCUMENTS

| CN | 101243604 A | 8/2008 |
| DE | 3931558 A1 | 1/1990 |
| WO | WO 2008030919 A2 | 3/2008 |
| WO | WO 2009026968 A1 | 3/2009 |
| WO | WO 2009050943 A1 | 4/2009 |

* cited by examiner

*Primary Examiner* — Robert L. Deberadinis

(57) ABSTRACT

A saturation control unit for an interphase transforming unit is provided. The interphase transforming unit has a primary coil and a secondary coil which are magnetically coupled via a magnetic core member. The saturation control unit includes a minimum detecting unit and a maximum detecting unit. The minimum detecting unit detects a minimum value of a magnetizing current of the interphase transforming. The maximum detecting unit detects a maximum value of the magnetizing current. A saturation estimating unit is provided for estimating an offset value of the magnetizing current. A saturation control signal generating unit is provided for generating a saturation control signal for the interphase transforming unit based on the detected minimum value, the detected maximum value, and the estimated offset value.

14 Claims, 6 Drawing Sheets

US 8,860,255 B2

SATURATION CONTROL UNIT FOR AN INTERPHASE TRANSFORMING UNIT AND PWM CONTROL APPARATUS FOR A VOLTAGE CONVERTING DEVICE

CROSS-REFERENCE TO RELATED APPLICATIONS

This application is the US National Stage of International Application No. PCT/EP2009/062456, filed Sep. 25, 2009 and claims the benefit thereof. The International Application claims the benefits of U.S. provisional patent application No. 61/176,278 filed May 7, 2009. All of the applications are incorporated by reference herein in their entirety.

FIELD OF INVENTION

The invention relates to a saturation control unit for an interphase transforming unit.

Further, the invention relates to a PWM control apparatus for a voltage converting device.

BACKGROUND OF INVENTION

It is widely known that voltage converting devices are used in power generation for providing an output voltage to a grid or to a supplying network. Such a voltage converting device comprises voltage converting units which are arranged e.g. in parallel electrical connection to one another. The voltage converting units are electrically connected to a plurality of interphase transforming units each of which may comprise a primary coil and a secondary coil being magnetically coupled to one another via a magnetic core member.

In order to control or adapt the switching frequencies of the voltage converting units to one another, a pulse width modulation (PWM) control apparatus may be provided which outputs a control signal for each one of the voltage converting units. Further, the PWM control apparatus may be used for balancing magnetizing currents of the interphase transforming units, in order to allow for an improved operation of the voltage converting device.

WO 2008/030919 A2 discloses a voltage converting device which comprises three voltage converting units being in parallel electrical connection to one another. Each of the voltage converting units is electrically connected to a different one of three interphase transforming units, wherein each of the interphase transforming units comprises a primary coil and a secondary coil which are magnetically coupled to one another via a magnetic core member. In order to enable a phase shift of the voltage outputted by the voltage converting units and a balancing of the magnetizing currents of the interphase transforming units, a PWM control apparatus is provided which enables one of the voltage converting units acting as a master for the other two voltage converting units with respect to the load current. A feedback control signal to the two "slave" voltage converting units is based on a difference current obtained by a difference between the current of the "master" voltage converting unit and the current of a different one of the "slave" voltage converting units. Therefore, a balancing of the currents of the slave voltage converting units compared to the current of the master voltage converting unit is provided.

U.S. Pat. No. 4,802,079 discloses a PWM control apparatus for a voltage converting device. The voltage converting device comprises two voltage converting units being in parallel electrical connection to one another and two interphase transforming units each of which comprises one coil. The current provided by the voltage converting units are summed up and compared to a total reference current. Further, the currents provided by the voltage converting units are subtracted, in order to obtain the difference current. The summed currents and the difference current are combined in terms of signal adding and signal subtraction, and each of the two combination currents are compared to a reference signal before feeding signal back to the voltage converting units.

SUMMARY OF INVENTION

It is therefore an object of the invention to provide a saturation control unit for an interphase transforming unit and a pulse width modulation (PWM) control apparatus for a voltage converting device which account for a wave shape modification of the magnetizing current of at least one of the interphase transforming units.

In order to achieve the object defined above, a saturation control unit for an interphase transforming unit and a PWM control apparatus for a voltage converting device are provided.

According to an exemplary aspect of the invention, a saturation control unit for an interphase transforming unit is provided, wherein the interphase transforming unit comprises a primary coil and a secondary coil which are magnetically coupled via a magnetic core member, wherein the saturation control unit comprises a minimum detecting unit for detecting a minimum value of a magnetizing current of the interphase transforming unit, a maximum detecting unit for detecting a maximum value of the magnetizing current, a saturation estimating unit for estimating an offset value of the magnetizing current, and a saturation control signal generating unit for generating a saturation control signal for the interphase transforming unit based on the detected minimum value, the detected maximum value, and the estimated offset value.

According to another exemplary aspect of the invention, a PWM control apparatus for a voltage converting device is provided, the voltage converting device comprising a plurality of voltage converting units being in parallel electrical connection to one another and a plurality of interphase transforming units, wherein each of the interphase transforming units comprises a primary coil and a secondary coil which are magnetically coupled via a magnetic core member, wherein the primary coil of each one of the interphase transforming units is electrically connected to the secondary coil of another one of the interphase transforming units, wherein the apparatus comprises at least one magnetizing current determining unit, wherein each one of the magnetizing current determining units is adapted to determine a magnetizing current of a different one of the interphase transforming units, and at least one saturation control unit, wherein each one of the saturation control units is adapted to operate on a different one of the magnetizing currents and is adapted to output a saturation control signal for the one of the interphase transforming units.

The term "magnetizing current" of the interphase transforming unit may denote a current which may equal to a difference between a current supplied to the primary coil of the interphase transforming unit and a current induced in the secondary coil of the interphase transforming unit, wherein a flow direction of the currents may be taken into account.

The term "wave shape" of the magnetizing current may particularly denote a curve shape or a line shape of the magnetizing current of the interphase transforming unit. In particular, the term "wave shape modification" of the magnetizing current may particularly denote a deviation of an actual magnetizing current curve shape with respect to an ideal curve shape of the magnetizing current and may comprise a shift of the magnetizing current in terms of a DC offset value of the magnetizing current and/or high magnitude spikes or high amplitude spikes or high current spikes or high frequency spikes of the magnetizing current. Wave shape modification may also include an asymmetry of the positive and negative parts of the waveform above some arbitrary centre line which may or may not be at a current amplitude of zero current.

The term "offset value" of the magnetizing current may denote an offset of the magnetizing current arising from a DC offset of the magnetizing current. Such a DC offset may be deducible from a systematic shift of a hysteresis curve which may be determined by the magnetizing current and the magnetization of the interphase transforming unit. In particular, an offset of the magnetizing current may arise from a saturation of a magnetic core member of the interphase transforming unit in that the primary and secondary coils of the interphase transforming may be not equally fluxed. In particular, saturation of the magnetic core member may result in loss of balancing of the currents between the primary and secondary coils of the interphase transforming units such that the magnetizing current may comprise high magnitude spikes.

The term "inter-phase transforming unit" may particularly denote any transforming unit which is adapted to e.g. transform a voltage signal or a current signal from a first level to a second level. In particular, a first level may be a high voltage level or a high current level, and a second level may be a low voltage level or low current level, with the denomination "first" and "second" being mutually exchangeable. In particular, the term "inter-phase transforming unit" may be identically used to the terms "inter-phase reactor", "inter-bridge transforming unit" and/or "inter-bridge reactor", with the terms "inter-phase" and "inter-bridge" possibly being abbreviated by "IPT" and "IBT", respectively. In particular, an inter-phase transforming unit may comprise a transformer.

According to the exemplary aspects of the invention as defined above, a PWM control apparatus for a voltage converting device may be provided, wherein the PWM control apparatus may comprise saturation control units which may account for undesired wave shape modifications of magnetizing currents of interphase transforming units of the voltage converting device. Each of the interphase transforming units may comprise a primary coil and a secondary coil which are magnetically coupled to one another via a magnetic core member, in particular via a rectangular iron element with the primary and secondary coils of the interphase transforming units being arranged at opposite legs of the rectangular iron element. The voltage converting device may comprise a ring configuration or cyclic cascade configuration of the interphase transforming units in that the primary coil of each one of the interphase transforming units may be electrically connected to the secondary coil of another one of the interphase transforming units.

In order to account for a wave shape modification of the magnetizing currents of the interphase transforming units, in particular for an offset of magnetizing currents of the interphase transforming units, saturation control units may be provided, each of which generating a saturation control signal based on a detected minimum value, a detected maximum value, and an estimated offset value of the magnetizing currents of the interphase transforming units. The saturation control units may be adapted to output saturation control signals for the interphase transforming units. In particular, one magnetizing current may be generated by one interphase transforming unit, and this magnetizing current may be fed to one saturation control unit. The saturation control signal outputted by the one saturation control unit may be used as feed back for the interphase transforming unit on whose magnetizing current the saturation control units may operate.

In particular, in the case the voltage converting device may comprise two voltage converting units and one interphase transforming unit, the PWM control apparatus may comprise one magnetizing current determining unit and one saturation control unit.

In particular, in the case the voltage converting device may comprise more than two voltage converting units, then the number of voltage converting units, interphase transforming units, magnetizing current determining units, and saturation control units may be identical to one another.

In particular, the saturation control signal generating units may be adapted to sum the signed minimum value and the signed maximum value of the magnetizing current and to subtract the estimated offset value of the magnetizing current from the summed minimum and maximum values. Therefore a measure for the wave shape modification of the magnetizing current may be identified.

In particular, the minimum detecting unit and the maximum detecting unit may be adapted to determine the minimum value or trough and the maximum value or peak of the magnetizing current every cyclic PWM time period.

The saturation control unit may be a physical unit or may be a functionality provided by a computer. In particular, one computer implementing the functionality of all the saturation control units of the PWM control apparatus may be provided. In particular, at least one computer implementing the functionality of at least one of the saturation control units may be provided, wherein the number of computers may be less than or may be equal to the number of saturation control units of the PWM control apparatus.

Thus, an improved operation of the voltage converting device may be achieved in that saturation effects of the interphase transforming units, particularly the magnetic core member of the interphase transforming units, may be accounted for. Further, the interaction of a number of voltage converting devices together in parallel may show improved characteristics.

Next, further exemplary embodiments of the saturation control unit for an interphase transforming unit will be explained. However, these embodiments also apply to the PWM control apparatus for a voltage converting device.

The saturation estimating unit may comprise an integrating unit for outputting an integration value of the magnetizing current. In particular, the integrating unit may be adapted to integrate the magnetizing current over a time period. In particular, a time period may be determined by a cyclic time span in which the wave shape of the magnetizing current may repeat. Thus, an estimation of the (DC) offset value of the magnetizing current may be obtained, since a magnetizing current comprising no (DC) offset value comprises a symmetrical wave shape with respect to a time with minimum and maximum values of the magnetizing current being equal in magnitude, in particular with minimum and maximum values comprising values of different signs, but equal numbers.

The saturation estimating unit may comprise a normalizing unit for normalizing the integration value with respect to a length of a cyclic time period. In particular, the normalizing unit may be fixed in value such that a constant normalizing factor, particularly a time independent normalizing factor, may be applied to the integration value. Thus, average value of the DC offset value may be obtained.

The saturation estimating unit may comprise a gain unit for gaining the normalized integration value. In particular, gaining a value may comprise multiplying the value with a further gain value or gain coefficient, amplifying or attenuating the value using the gain value or determining the gain value for the value and apply the gain value to the value. In particular, the gain unit may be adapted to multiply the normalized integration value by a factor N, particularly by a factor N between 0 and 1. More particularly, the factor N may equal to one half. In particular, the gain unit may be fixed in value such that a constant factor N, particularly a time independent factor N, may be applied to the normalized integration value. The gain unit may be arranged upstream of the saturation control signal generating unit. The gain unit may correct for the integration value being a multiple of the (DC) offset value of the magnetizing current.

The saturation control unit may further comprise a sampling unit for sampling the saturation control signal and for outputting the sampled saturation control signal. Subsequent to combining the detected minimum value, the detected maximum value, and the estimated offset value of the magnetizing current, the obtained saturation control signal may be sampled such that a time information may be provided to the at least one interphase transforming unit. In particular, the output of the saturation control unit (the obtained saturation control signal) may be used to modify the output voltage of at least one voltage converting unit, particularly of the voltage converting units to change the operating conditions of at least one interphase transforming unit.

In particular, the minimum detecting unit and the maximum detecting unit may be adapted to detect the minimum value and the maximum value by determining a local or global minimum value and local or global maximum value of the magnetizing current, respectively. In particular, when detecting the minimum value and the maximum value of the magnetizing current, the minimum detecting unit and the maximum detecting unit may be set to these detected values.

The minimum detecting unit may be adapted to be reset to a minimum reset value, and the maximum detecting unit may be adapted to be reset to a maximum reset value. In particular, the minimum reset value and the maximum reset value may be identical to one another. In particular, the minimum reset value and the maximum value may be different to one another depending on the wave shape modification of the magnetizing current. In particular, the minimum reset value and the maximum reset value may be identical to one another with respect to a magnitude in that the minimum reset value and the maximum reset value may comprise different signs, but an equal number. In particular, the minimum reset value and the maximum reset value may be value(s) close to zero, however, the minimum reset value and the maximum reset value may be value(s) different from zero. In particular, the reset value(s) may be chosen, in order to compensate the wave shape modification, particularly the (DC) offset value, of the detected magnetizing current. In particular, the minimum reset value and/or the maximum reset value may be positive or negative depending on the wave shape modification, particularly the (DC) offset value, of the detected magnetizing current. In particular, resetting of the minimum detecting unit and maximum detecting unit may be simultaneously or successively performed. In particular, resetting of the minimum detecting unit and/or maximum detecting unit may be performed when outputting the sampled saturation control signal. In particular, resetting of the minimum detecting unit and/or maximum detecting unit may be performed when generating the saturation control signal. In particular, resetting of the minimum detecting unit may be performed when the magnetizing current may comprise a maximum value, particularly when the maximum detecting unit may detect a maximum value. In particular, resetting of the maximum detecting unit may be performed when the magnetizing current comprises a minimum value, particularly when the minimum detecting unit may detect a minimum value. In particular, resetting times of the minimum detecting unit and/or maximum detecting unit may coincide with a switching frequency of the voltage converting units. Due to the reset of the minimum detecting unit and/or the maximum detecting unit, an improved detecting ability of the minimum detecting unit and/or the maximum detecting unit may be provided, thereby improving the accurateness of the saturation control signal with respect to the (DC) offset value of the magnetizing current.

In particular, the minimum detecting unit may be adapted to be reset to an extreme positive value which may be much greater than the most positive value of the magnetizing current ever expected, and the maximum detecting unit may be adapted to be reset to an extreme negative value which is much less than the most negative value of the magnetizing current ever expected.

In particular, the integrating unit may be adapted to be reset to an integration reset value, particularly to zero, subsequent to outputting the integration value. In particular, a reset of the integrating unit may be performed in timely periods, particularly in correlation to a switching frequency of the voltage converting units. Thus, an undesired erroneous integration of a next integration value may be prevented in that an outputted integration value may be cancelled or deleted or reset to the integration reset value before generating a further integration value.

The saturation control unit may comprise a further gain unit for gaining an input signal inputted to the further gain unit. In particular, gaining a value may comprise multiplying the value with a further gain value or gain coefficient, amplifying or attenuating the value using the gain value or determining the gain value for the value and apply the gain value to the value. The further gain unit may be arranged upstream or downstream of the sampling unit, thereby gaining the saturation control signal or the sampled saturation control signal, respectively. The gain unit may be adapted to gain its input signal using a fixed gain value, particularly a time independent gain value. The gain unit may be adapted to gain its input signal using a variable gain value, particularly a time dependent gain value which may be adjusted accordingly.

A smoothing unit may be provided for smoothing the magnetizing current, in order to account for background noise superimposed on the magnetizing current. In particular, background noise may add shifts to the magnetizing current values of the time dependent magnetizing current such that a wave shape of the time dependent magnetizing current may deviate from a "smooth" or ideal wave shape of the magnetizing current. In particular, the smoothing unit may be part of the minimum detecting unit, the maximum detecting unit and/or the integration unit or may be at least one independent unit being arranged upstream of the minimum detecting unit, the maximum detecting unit and/or the integration unit. In particular, smoothing of the magnetizing current may comprise moving window averaging along a moving window of N samples, particularly averaging the magnetizing current within a time window. A sample may be a magnetizing current value. A length of the window may comprise a length of a time interval in which a smoothing operation may be applied. A window length may be varied during different smoothing operations depending on the wave shape of the magnetizing current. In particular, averaging the magnetizing current may comprise summing the magnetizing current values within the time interval and normalizing the summed magnetizing current values with respect to the number of the summed magnetizing current values. In particular, smoothing the magnetizing current may comprise integrating the magnetizing current over a time interval and normalizing the integrated magnetizing current to the number of samples or magnetizing current values within the time interval and to the length of the time interval, wherein integration limits may particularly be zero and equal to a number of magnetizing current values in the time interval multiplied with the length of the time interval.

Next, further exemplary embodiments of the PWM control apparatus for a voltage converting device will be explained. However, these embodiments also apply to the saturation control unit for an interphase transforming unit.

One magnetizing current determining unit may be provided for one of the interphase transforming units, thereby allowing for compensating of a saturation effect of each one of the interphase transforming units of the voltage converting device.

Each one of the magnetizing current determining units may be adapted to determine a difference current between a current of one of the voltage converting units and a current of another one of the voltage converting units, wherein each one of the saturation control units may be adapted to output the saturation control signal for the one of the voltage converting units and the another one of the voltage converting units. In particular, the interphase transforming units may be designed identically to one another, wherein the characteristics, particularly the number and material of windings, of the primary and secondary coils of the interphase transforming units may be identical to one another. Magnitudes of currents induced in the primary and secondary coils may be therefore identical to one another, since inductivity losses in the primary and secondary coils may be identical to one another. Thus, a magnetizing current of an interphase transforming unit may correspond to the difference current obtained as a difference between a current outputted by one of the voltage converting units and a current outputted by another one of the voltage converting units. Further, the saturation control signals for the interphase transforming units may be used for controlling the voltage converting units, whereby a saturation control of the interphase transforming units may be accomplished by mediating the saturation control of the interphase transforming units by the voltage converting units. In particular, the saturation control signal outputted by the one saturation control unit may be used as feed back for the two voltage converting units driving one interphase transforming unit on whose magnetizing current the saturation control unit may operate.

The PWM control apparatus may further comprise signal combining units, wherein each one of the signal combining units may be adapted to combine a saturation control signal of one of the saturation control units with a saturation control signal of another one of the saturation control units and may be adapted to output a combination signal (for example, as feedback) for the interphase transforming units (for example, for one of the voltage converting units driving the interphase transforming units). Owing to the ring configuration or cyclic cascade configuration of the interphase transforming units a current correlation of the two interphase transforming units may be thus achieved whose primary coils may be electrically connected to the one of the voltage converting devices and the another one of the voltage converting devices, respectively.

A signal combination of the saturation control signal of one of the saturation control units with a saturation control signal of another one of the saturation control units may comprise a signal subtraction. By combining two saturation control signals of two different saturation control units by means of signal subtraction a current or load balancing may be provided between the two interphase transforming units whose magnetizing current may serve as basis for an operation of the saturation control units. In particular, a load of these two interphase transforming units may be readjusted with respect to the difference of the magnetizing currents of the two interphase transforming units. In particular, a ring configuration of the combining units may be provided, since each one of the combining units may be adapted to operate on a saturation control signal of one of the saturation control units and a saturation control signal of another one of the saturation control units.

The PWM control apparatus may further comprise comparing units, wherein each one of the comparing units may be adapted to compare a reference signal with a different one of the combination signals and to output a comparison signal for the one of the interphase transforming units, particularly for the one of the voltage converting units and to the another one of the voltage converting units. Thus, a PWM control or adaption or readjustment for the voltage converting device is provided, wherein a compensation or counteraction of a saturation of the interphase transforming units may be part of the PWM control. A reference signal may be provided by at least one carrier generating unit. In particular, one carrier generating unit may be provided for one comparing unit. A comparison signal feeding for the one of the voltage converting units and the another one of the voltage converting units may be accomplished in that the comparison signal may be split into two portions which are phase shifted to one another. In particular, phase shift elements may be provided in one of the two split signal paths.

In particular, the number of voltage converting units, the number of interphase transforming units, the number of magnetizing current determining units, the number of saturation control units, the number of combining units, the number of comparing units, the number of carrier generating units, and the number of phase shift elements may be identical to one another.

The PWM control apparatus may further comprise a magnitude total load current control unit which may be adapted to operate on a magnitude total load current and may be adapted to output the magnitude total load current control signal (for instance, a signal dimensioned in terms of modulation level as a percentage of dc link voltage or output voltage) to each of the combining units. In particular, signal combining performed by the combining units may comprise adding the magnitude total load current control signal (particularly a voltage signal) to the difference between the saturation control signal of the one of the saturation control units and the saturation control signal of the another one of the saturation control units. Thus, a readjustment of an absolute value or a magnitude of the total load current of each one of the interphase transforming units may be provided, wherein a correlation, particularly a balancing, of the magnetizing currents of the interphase transforming units relative to a total load current may be achieved.

The PWM control apparatus may further comprise a total load current determining unit which may be adapted to determine a total load current based on load currents of the voltage converting units and may be adapted to output a total load current and a magnitude total load current determining unit which may be adapted to determine a difference between a reference total load current and the total load current and may be adapted to output the magnitude total load current. A reference total load current may be a set point of the load current, particularly a current value which is constant with time, such that a readjustment of an absolute value or a magnitude of the total load current may be accomplished. In particular, a control or adaption or readjustment of the currents of the voltage converting units to one another may be accomplished.

In particular, the total load current determining unit may be adapted to determine the total load current based on the load currents of the individual voltage converting units. In particular, the total load current may be a sum of the load currents of the voltage converting units. In particular, the load current of a voltage converting unit may be identical to the current outputted by the voltage converting unit.

In particular, the magnitude total load current determining unit may be a magnitude total load current error determining unit which may be adapted to determine an error of the total load current with respect to the reference total load current and may be adapted to output a magnitude total load current error. In particular, a magnitude total load current error may be identical to the magnitude total load current.

According to another exemplary aspect of the invention, inter-bridge transformers (IBT) may be used to achieve firstly an increase in the effective switching frequency of multi-parallel inverters without increasing the actual switching frequency of the individual voltage converting units and secondly a balancing of the output current of the multi-parallel inverters so to ensure equal load distribution between the inverters. By suitable phase shift of the harmonic output of the individual inverter phases, the resulting harmonic frequencies seen at the common node (that connected to the load) may be free of at least the first harmonic components of the switching frequency of each inverter. Taking an example with four inverter modules each with a switching frequency of about 2.5 kHz with the respective PWM signals suitably phase shifted from each other and connected together in an array with IBTs may result in harmonics at the output node relating to about 10 kHz, so achieving cancellation of about 2.5, about 5 and about 7.5 kHz related harmonics at the commoning node.

In particular, four inverter half-bridges may be coupled via interbridge transformers to form one or a single complete network phase.

A method/algorithm to remove the DC component from the magnetic flux in the IBT iron cores may be achieved, in this way avoiding hard saturation of the core. Hard saturation may corrupt the current balancing and though the load distribution, and may therefore be unwanted. Saturation of the core may also result in the low order harmonic components of the inverter harmonics (about 2.5 kHz, about 5 kHz, about 7.5 kHz) being present at the commoning node.

An objective of the proposed exemplary aspect of the invention may be eliminating the risk of saturating the iron cores of the IBTs. Saturation may occur, if the magnetic flux density in the IBT cores exceeds the saturation limit, by, for example, forcing a large DC offset in the flux.

In real world systems, tolerances in current measurement equipment may contribute with enough error to make this happen, because the tolerances (offsets) may be carried right through the control system and even reinforcing an initially light saturation. So therefore removal of the DC component from the measured magnetizing current may become important.

In operation without saturation, the magnetizing current ($i_m$) slopes may be perfect ramp shaped (constant slope). But when saturation may occur, the current slope may start to increase introducing high amplitude spikes in the magnetizing current.

An IBT and corresponding voltage and magnetizing current wave forms may be described using an electrical equivalent.

According to the present exemplary aspect of the invention, a magnetic saturation control scheme may be provided, which itself may be a part of an overall current control system responsible for controlling both load current and magnetizing current at the same time. The system may be configured in a ring configuration and may be applied to an arbitrary number of paralleled inverters from two and up.

In the following, the full control system for two paralleled inverters may be described for explaining the basic operation, similarly for four paralleled inverters. Here the ring configuration may be evident.

The load current controller may be exposed to the difference between the actual load current (sum of all inverter output currents) and the total load current reference value. The output signal from this controller may be fed forward with equal polarity to each comparator block.

The saturation control units may be exposed to the difference between two adjacent inverter output currents, because this may be equal to the magnetizing current $i_m$. The output signal from the individual controllers may be then subtracted from the upper inverters load current control signal and added to the lower inverters load current control signal. So, if the upper inverter is carrying a higher load current than the lower one, a positive control signal may be generated, and this may be subtracted from the upper inverters control signal to compensate for the current difference and visa versa for the lower inverter. If no difference in peak values is present, then no compensation may be applied.

According to the present exemplary aspect of the invention, the saturation control may be performed by the saturation control units, in four events during each PWM sub cycle. The following events may be used: Firstly, detection and summing of the peak and trough values of the magnetizing current; secondly, estimation of the magnetizing current DC component; thirdly, calculation of a control signal based on the peak and trough values and the DC component; and fourthly, sample and hold of the resulting control signal.

The current DC component may be equal to the average value current during each PWM cycle, and this may be obtained by integration over one PWM period and dividing by the period time.

After removing the DC component, the signal may contain the AC part of the measured signal only. The current spikes due to saturation may be preserved during the removal of the DC component, which may be important to the method and/or device according to the exemplary aspect of the invention, because the control may only be sensitive to the magnetic saturation.

From the magnetizing current signal, the peaks and troughs may be logged throughout each PWM cycle. In the absence of saturation, the peaks and troughs may have the same magnitude, because the DC component may be removed and the current may then be in balance. Therefore when the peak and trough values may be summed, the resultant may be zero and no control action may be taken. In the other case in which saturation may be present, the peak and trough absolute values may not be equal because of the slope increase in the saturated half cycle. When the peak and trough values may be summed, the resultant may become non zero and a control action may be performed.

The polarity of the control signal may always follow the polarity of the saturated current spike, and therefore always providing unique and sufficient information about at which side the control action may have to be applied, to control and balance the magnetizing current again.

One significant advantage of the saturation dependent control may be that the IBTs may be designed to permanently operate at the edge of saturation and thus allowing full utilization of the IBT core material, because a large head room to counter a DC component may not be required. In fact, if large headroom is provided, then there may be nothing in this control system that would recognize that situation and the headroom may be used and the magnetizing current and so the flux may find a steady state condition just on the verge of positive or negative saturation.

Running min/max magnetizing current detectors may be described in the following: The running min/max detectors may be utilized to capture the peaks and troughs of the magnetizing current during each PWM period. For a two parallel inverter scheme, the peaks and troughs may always appear at a fixed time. Therefore in that case a fixed sample time may be sufficient to catch the peaks and troughs and this may be determined from the inverter PWM pattern directly.

But for the case having three or more paralleled inverters with phase displaced carriers, then because of saturation, the peak and troughs may not appear at fixed instants, but rather may be moving in time depending how severe the saturation may be. Therefore the running detectors may used instead of fixed time sampling.

As the period of time may have passed, where the individual peaks and troughs may be expected to appear and after the control signal may be generated, the detectors may be reset to an appropriate value. Under normal conditions, where the peaks and troughs may appear at each side of zero, the reset value may be sufficiently chosen to zero. Resetting to zero may not be sufficient, in the situation where peaks and troughs may be both positive due to a large current DC or LF component. Here, the zero value from the resetting may be seen as the global minimum. Because the real trough value may be not detected, a wrong control signal may be generated.

To ensure correct detection, the reset value may be applied with a polarity and value that may be sufficient even in the expected worst case situation. The reset value may be set to opposite polarity of normal condition peak and trough values and to a high value.

Extraction of the peak and trough values from noisy measurements may be described in the following:

The magnetizing current wave forms may be all ideal wave forms not containing any back ground noise. Real world current measurement wave forms may contain a given amount of noise depending on the physical layout and measurement equipment noise immunity.

In the control scheme according to an exemplary aspect of the invention, a single sample value may be to be detected by the min and max detectors, making it vulnerable to back ground noise, because the particular sample may deviate significantly from the real value resulting in wrong correction. To counter the sensitivity to background noise, moving averaging may be applied to the measured signal from the measurement equipment.

The moving averaging relationship may be described by $$i_m = \frac{1}{N*T_s} \int_{N*T_s}^{0} i_m(t)dt.$$

Here, N may be the number of samples within the window and $T_s$ may be the sample period.

As one possible embodiment of the scheme with a nominal switching frequency (PWM frequency) of about 2.5 kHz, an averaging window period of about 10 to about 20 µs may be then an appropriate setting.

According to the exemplary aspect of the invention, it may be provided that the impact of eventual DC or LF (low frequency) offsets introduced by tolerances in measurement equipment and due to quantized signal paths in uP/FPGA etc may be reduced, by removing the DC offset from the measured magnetizing current and only focusing on the peak and trough values of the magnetizing current which may carry the information relating to saturation. The method and/or device according to the exemplary aspect of the invention may be saturation sensitive—only applying compensation, if a difference in the absolute value of peak and trough values may exist. If no saturation is measured, then no compensation action may be taken.

Conclusively, a control scheme to remove the DC component from the magnetizing current in interbridge transformers in multiple paralleled inverter systems may be described. The scheme may be modular and may be applied to an arbitrary number of paralleled inverters coupled together by IBTs. The scheme may work by comparing the peak and trough values in measured magnetizing current after the DC component may be removed. The scheme may be saturation sensitive—that may mean a zero control signal and no compensation may be applied, when no saturation may occur. Peak and trough values may be detected by min and max value detectors. By the resetting of these detectors, the consequences of having a high DC component in the current may be taken into consideration. Measures to account for back ground noise in the measured current may be taken by applying moving window averaging along a moving window of N samples.

BRIEF DESCRIPTION OF THE DRAWINGS

The aspects defined above and further aspects of the invention are apparent from the examples of embodiments to be described hereinafter and are explained with reference to the examples of embodiment. The invention will be described in more detail hereinafter with reference to examples of embodiment but to which the invention is not limited.

DETAILED DESCRIPTION OF INVENTION

Figure 1:
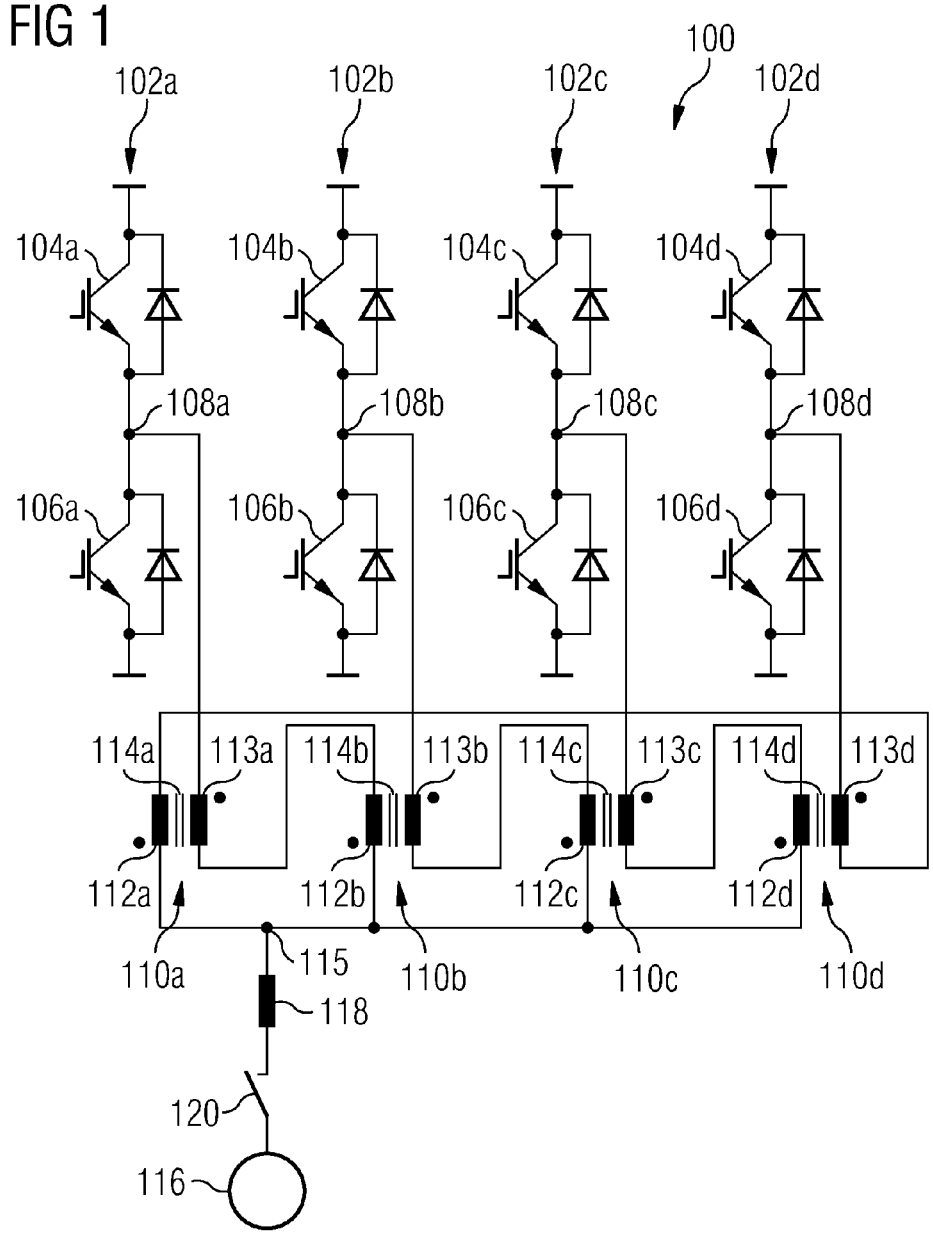
FIG. 1 illustrates a voltage converting device.

The illustration in the drawings is schematically. In different drawings, similar or identical elements are provided with the same reference signs.

Referring to FIG. 1, a voltage converting device 100 is shown which is used in power generation for outputting a single phase voltage signal. The voltage converting device 100 comprises four voltage converting units 102a-d which are in parallel electric communication to one another. Each of the voltage converting units 102a-d comprises switching elements 104a-d, 106a-d. An output 108a-d of each of the voltage converting units 102a-d is electrically connected to a different one of four interphase transforming unit 110a-d. Each of the interphase transforming units 110a-d comprises a primary coil 112a-d and a secondary coil 113a-d which are magnetically coupled to one another by a magnetic core member 114a-d. The primary coils 112a-d and the secondary coils 113a-d of the interphase transforming units 110a-d are identical to one another. The interphase transforming units 110a-d are arranged in a cyclic cascade or ring configuration and are adapted to output transformed voltage signals. The primary coil 112a-d of each one of the interphase transforming units 110a-d is electrically connected to the secondary coil 113a-d of another one of the interphase transforming units 110a-d. The secondary coil 113a-d of each one of the interphase transforming units 110a-d is electrically connected to a common output 115. The output voltage outputted by the common output 115 is transferred to a load 116 via an inductivity 118 and a switch 120.

Figure 2:
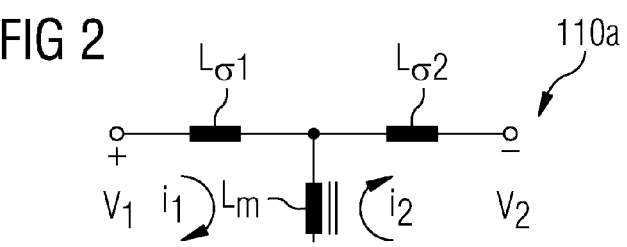
FIG. 2 illustrates an electrical equivalent of an interphase transforming unit of the voltage converting device in FIG. 1.

FIG. 2 shows an electrical equivalent of the interphase transforming unit 110a in FIG. 1.

Figure 3:
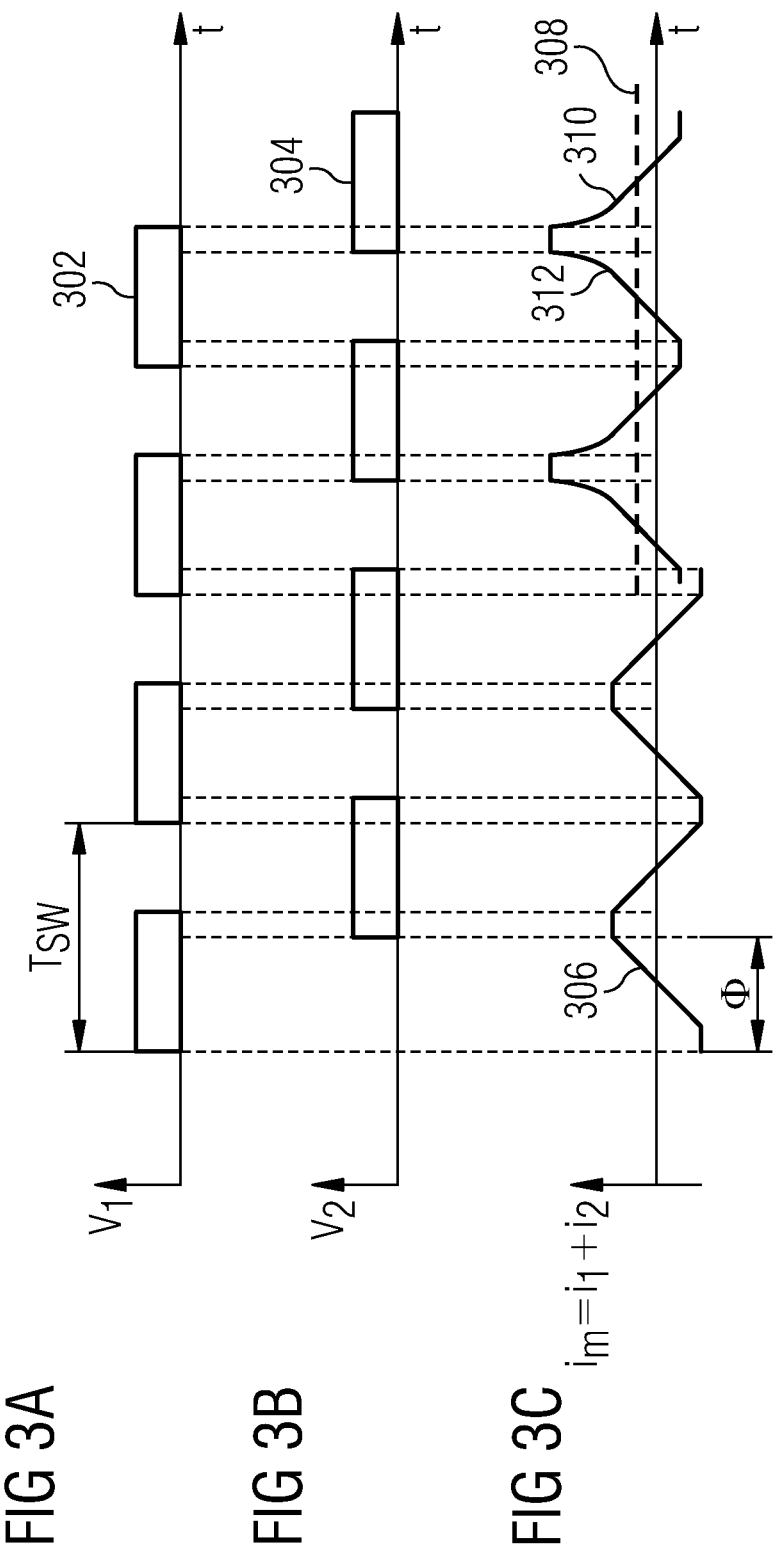
FIG. 3A illustrates a time dependency of a voltage applied across a primary coil of the interphase transforming unit in FIG. 1.
FIG. 3B illustrates a time dependency of a voltage applied across a secondary coil of the interphase transforming unit in FIG. 1.
FIG. 3C illustrates a time dependency of a magnetizing current of the interphase transforming unit in FIG. 1 in a not saturated and saturated state of a magnetic core member of the interphase transforming unit.

Applying an input voltage $V_1$ to the primary coil 112a of the interphase transforming unit 110a induces an input current $i_1$ in the primary coil 112a of the interphase transforming unit 110a. As shown in FIG. 3A, the applied voltage $V_1$ comprises a duty cycle of a pulse length of $T_{sw}$. A voltage $V_2$ is applied across the secondary coil 113a of the interphase transforming unit 110a. The duty cycle of the applied voltage $V_2$ is timely shifted by a time span $\Phi$ relative to the duty cycle of the input voltage $V_1$ (FIG. 3B). Hereby a magnetizing current $i_m$ is induced in the magnetizing inductance $L_m$. A magnetizing current $i_m$ which is equivalent to the sum of the signed current $i_1$ and the signed current $i_2$ is generated, i.e. $i_m = i_1 + i_2$ with $i_1$ and $i_2$ comprising different signs.

In operation of the interphase transforming unit 110a, the magnetic core member 114a is magnetized in that a magnetic flux density is induced in the magnetic core member, wherein the magnetic flux density shows a hysteresis. The magnetizing current $i_m$ indicated in FIG. 3C as a curve 306 is symmetrically shaped with respect to its half cyclic time period. A wave shape of the magnetizing current 306 is timely repeating in the cyclic time period and shows perfectly ramped shaped slopes.

By forcing a DC offset value 308 in the wave shape of the magnetizing current 310 (FIG. 3C), the magnetic core member 114a may reach the saturated state. Further, the magnetizing current 310 comprises high magnitude spikes 312 which result from the hysteresis of the iron core.

In order to compensate the changed wave shape of the magnetizing current 310 due to the DC offset value 308, a PWM control apparatus is provided.

Figure 4:
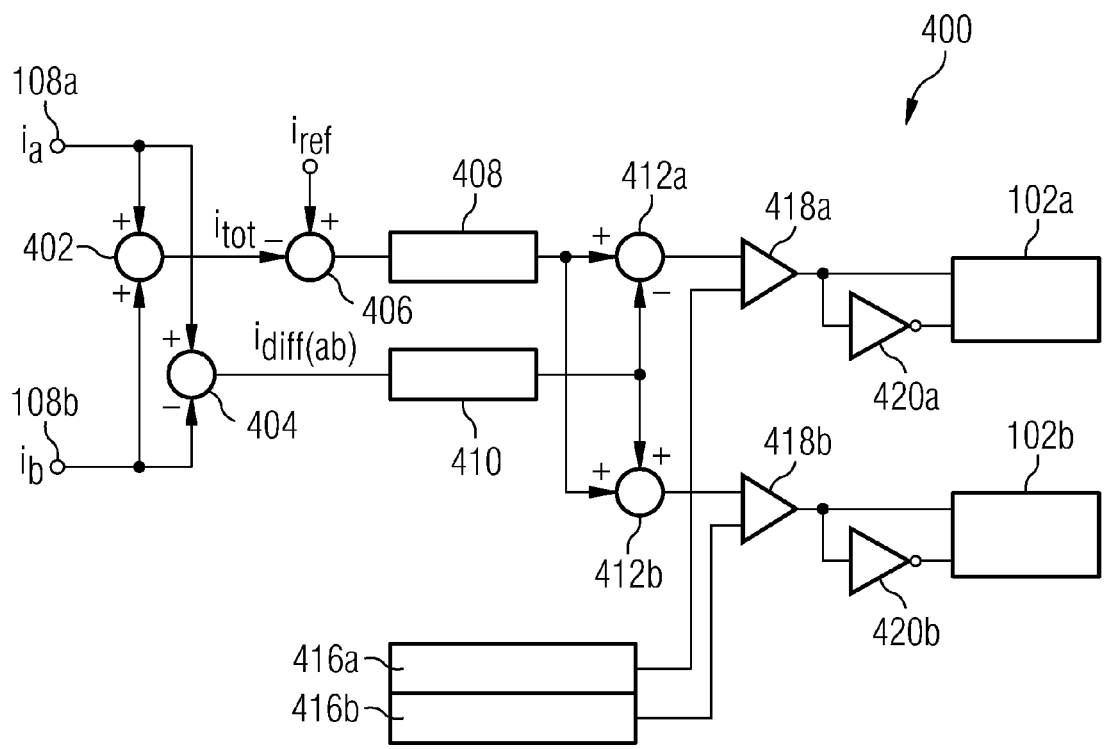
FIG. 4 illustrates a PWM control apparatus according to an exemplary embodiment of the invention for a voltage converting device.

Referring to FIG. 4, a pulse width modulation (PWM) control apparatus 400 for a voltage converting device is shown. The voltage converting device is identically designed to the voltage converting device in FIG. 1, however, comprises only two voltage converting units and only one interphase transforming unit. It is also possible to use two interphase transforming units.

The PWM control apparatus 400 comprises a total load current determining unit 402, namely an adding unit, which is adapted to add currents $i_a$, $i_b$ outputted by the outputs 108a, 108b of the two voltage converting units and to output a total load current $i_{tot}$. Further, the apparatus 400 comprises a magnetizing current determining unit 404 which is adapted to determine a difference current $i_{diff(ab)}$ of the currents $i_a$, $i_b$ provided by the outputs 108a, b. This difference current $i_{diff(ab)}$ is identical to the magnetizing current of the interphase transforming units.

A magnitude total load current error detecting unit 406 is electrically connected to the total load current determining unit 402 and is adapted to subtract the total load current $i_{tot}$ from a reference total load current $i_{ref}$. A magnitude total load current control unit 408 is electrically connected to the magnitude total load current error determining unit 406 and is adapted to output a magnitude total load current control signal.

A saturation control unit 410 is electrically connected to the magnetizing current detecting unit 404 and is adapted to output a saturation control signal.

Combining units 412a, b are electrically connected to the magnitude total load current control unit 408 and the saturation control unit 410 and are adapted to combine the magnitude total load current control signal and the saturation control signal and to output combination signals. In particular, the combining unit 412a is adapted to subtract a saturation control signal from the magnitude total load current control signal. The combining unit 412b is adapted to add the saturation control signal and the magnitude total load current control signal, such to balance the magnetizing current, if unbalance occurs.

Carrier generating units 416a, b are provided and adapted for outputting carrier signals or reference signals to be fed to comparing units 418a, b. The comparing units 418a, b are also electrically connected to the combining units 412a, b. The comparing units 418a, b are adapted to compare the carrier signals and combine signals provided by the combining units 412a, b to one another, respectively, and to output comparison signals to the voltage converting units 102a, b. Further, the comparison signals for each one of the voltage converting units 102a, b are split into two portions, wherein phase shifting elements 420a, b are provided in one of the two signal paths for each one of the voltage converting units 102a, b such that a phase of the switches 104a, b is shifted relative to a phase of the switches 106a, b.

In operation of the apparatus 400, the magnetizing current is generated by the magnetizing current detecting unit 404. The generated magnetizing current is fed to the saturation control unit 410 generating a saturation control signal which is fed to the combining units 412a, b.

The total load current $i_{tot}$ is generated by the total load current determining unit 402 in that the currents $i_a$, $i_b$ outputted by the outputs 108a, b are summed. The total load current $i_{tot}$ is fed to the magnitude total load current error determining unit 406 such that load current error is generated. The magnitude total load current error is fed to the magnitude total load current control unit 408 which generates a magnitude total load current control signal. The magnitude total load current control signal is fed to the combining units 412a, b.

Combining signals provided by the combining unit 412a, b are fed to the comparing units 418a, b and are compared to the carrier signals provided by the carrier generating units 416a, b. The comparison signals provided by the comparing units 418a, b are fed to the switches 104a, b, 106a, b of the voltage converting units 102a, b.

Figure 5:
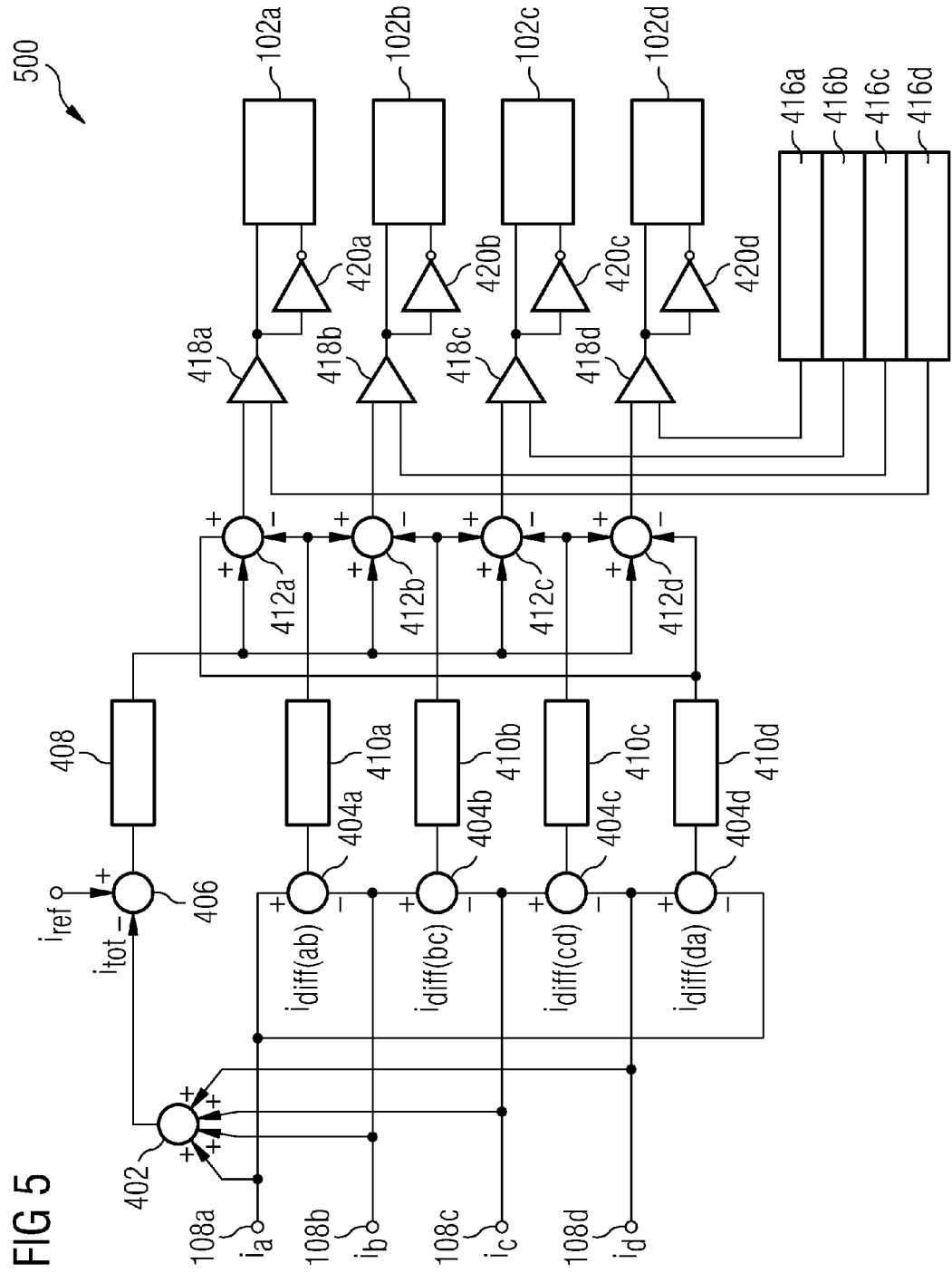
FIG. 5 illustrates a further PWM control apparatus according to an exemplary embodiment of the invention for the voltage converting device in FIG. 1.

FIG. 5 shows a PWM control apparatus 500 for the voltage converting device 100 in FIG. 1.

The apparatus 500 is an extension of the apparatus 400. The apparatus 500 comprises an equal number of magnetizing current determining units 404a-d, saturation control units 410a-d, combining units 412a-d, comparing units 418a-d, carrier generating units 416a-d, phase shifting elements 420a-d as a number of interphase transforming units 110a-d and a number of voltage converting units 102a-d.

Thus, each one of the magnetizing current determining units 404a-d is adapted to determine a magnetizing current $i_m$ which corresponds to a difference current $i_{diff(ab)}$, $i_{diff(bc)}$, $i_{diff(cd)}$, $i_{diff(da)}$ between the outputs 108a-d of the voltage converting units 102a-d. The total load current determining unit 402 is adapted to add the currents $i_a$, $i_b$, $i_c$, $i_d$ outputted by the outputs 108a-d of the voltage converting units 102a-d and to output a total load current $i_{tot}$.

One magnitude total load current control unit 408 is arranged downstream of a magnitude total load current error determining unit 406 and is adapted to output a magnitude total load current control signal to four combining units 412a-d.

Four saturation control units 410a-d are provided, each of them being adapted to operate on a different one of the magnetizing currents $i_{diff(ab)}$, $i_{diff(bc)}$, $i_{diff(cd)}$, $i_{diff(da)}$ and to output a saturation control signal to be fed to two different combining unit 412a-d.

Each one of the combining units 412a-d is adapted to operate on the output signal of the magnitude total load current control unit 408 and the saturation control signal of two of the saturation control units 410a-d. For instance, the combining unit 412a is adapted to add the magnitude total load current control signal to the saturation control signal provided by the saturation control unit 410d and subtract the saturation control signal provided by the saturation control unit 410a. Further, the combining unit 412b is adapted to add the magnitude total load current control signal to the saturation control signal provided by the saturation control unit 410a and subtract the saturation control signal provided by the saturation control unit 410b.

Each one of the comparing units 418a-d is adapted to operate on a different one of the combination signals and a different of the carrier signals generated by the carrier generating units 416a-d. Further, each one of the comparing units 418a-d is adapted to output a comparison signal which is split into two signals, one of the two signals being phase shifted by a phase shift element 420a-d before feeding the signals to the switches 104a-d, 106a-d of the voltage converting units 102a-d.

Figure 6:
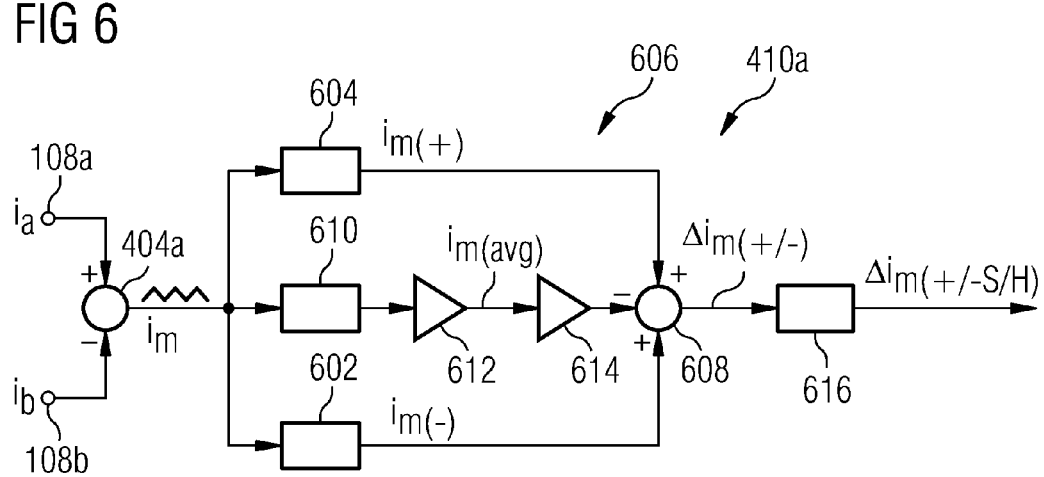
FIG. 6 illustrates a saturation control device of the PWM control apparatus in FIG. 5.

Referring to FIG. 6, the saturation control unit 410a shown in FIG. 5 is described in more detail.

The saturation control unit 410a is adapted to operate on the magnetizing current $i_m$ being equal to the difference current of the currents $i_a$, $i_b$ outputted by the outputs 108a, b of the voltage converting units 102a, b. The saturation control unit 410a comprises a minimum detector 602, a maximum detector 604, a saturation estimating unit 606 for determining a DC offset value of the magnetizing current (FIG. 3C), and a saturation control signal generating unit 608. The minimum detector 602, the maximum detector 604, and the estimating unit 606 are arranged in parallel to one another. The minimum detecting unit 602 is adapted to determine a minimum value of the magnetizing current within a cyclic time period. Further, the maximum detecting unit 604 is adapted to detect a maximum value of the magnetizing current within a cyclic time period. The signal generating unit 608 is adapted to sum the detected minimum value, the detected maximum value, and to subtract the sampled DC offset value.

The saturation estimating unit 606 comprises an integrating unit 610 for determining a DC offset value of the magnetizing current, a normalizing unit 612 for normalizing the determined DC offset value, and a gain unit 614. The integrating unit 610 is adapted to integrate the magnetizing current over a cyclic time period. The normalizing unit 612 is adapted to operate on the output signal of the integrating unit 610 and to normalize the outputted integration value with respect to a cyclic time period $T_{sw}$. The gain unit 614 is fixed to the value of 2, and the output is the normalized integration value before feeding the normalized DC offset value to the saturation control signal generating unit 608.

A sampling unit 616 is arranged downstream of the saturation control signal generating unit 608 and is adapted to sample the saturation control signal with respect to a time period.

Figure 7A:
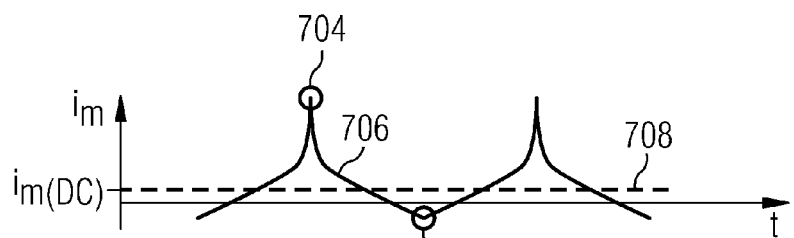
FIG. 7A illustrates a time dependency of the magnetizing current with high current spikes of the interphase transforming unit in FIG. 1.
Figure 7B:
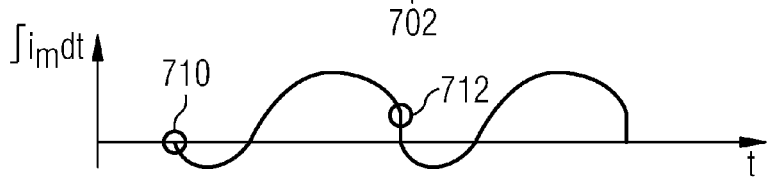
FIG. 7B illustrates an operation of an integrating unit of the saturation control unit in FIG. 6.
Figure 7C:
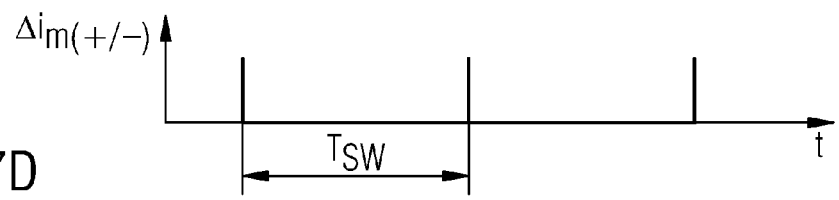
FIG. 7C illustrates a time dependency of an output signal of a saturation control signal generating unit of the saturation control unit in FIG. 6.
Figure 7D:
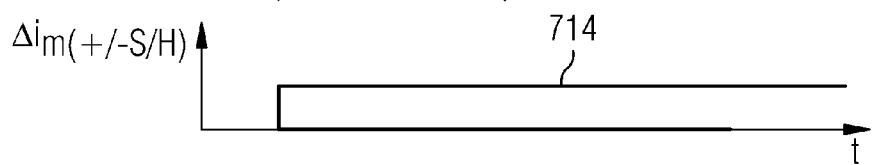
FIG. 7D illustrates a time dependency of a saturation control signal for the interphase transforming unit in FIG. 1.

Referring to FIG. 7A-7D, an operation of the saturation control unit 410a will be explained. Minimum values 702 and maximum values 704 are determined from a wave shape of the magnetizing current 706 by the minimum and maximum detectors 602, 604 and are fed to the saturation control signal generating unit 608. Further, a DC offset value 708 of the magnetizing current is determined by means of integrating the magnetizing current 706 over a cyclic time period in which the wave shape of the magnetizing current 706 repeats. Lower and upper limits 710, 712 of the integration operation correspond to a start point 710 of the cyclic time period and an end point 712 of the cyclic time period (FIG. 7B). The obtained integration value is normalized in that an integration value is divided by a length $T_{sw}$ of the cyclic time period. Further, the normalized integration value is multiplied by a factor of two (FIG. 7C). The minimum value 702 and the maximum value 704 are summed and the estimated DC offset value is subtracted from the sum, thereby forming the signal $\Delta i_{m(+/-)}$ (FIG. 7C). Further, the minimum and maximum detecting units 602, 604 and the integrating unit 610 are reset after the DC offset value is obtained. The obtained control signal $\Delta i_{m(+/-)}$ is sampled ($\Delta i_{m(+/-S/H)}$) and given out (FIG. 7D).

Figure 8A:
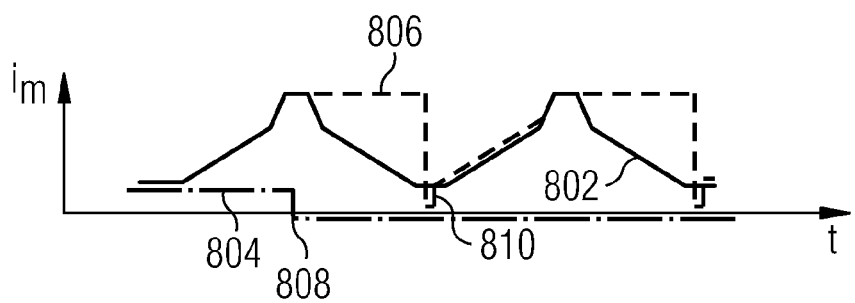
FIG. 8A illustrates a scheme for resetting a magnetizing current to a zero value.

Referring to FIG. 8A, B, a reset operation of the minimum detecting unit 602 and the maximum detecting unit 604 is explained. When outputting the sampled saturation control signal, the minimum detecting unit 602 and the maximum detecting unit 604 are reset to a reset minimum value and a maximum reset value, wherein a magnitude and a sign of the reset value are adapted according to the DC offset value.

FIG. 8A illustrates an insufficient reset of the minimum and maximum detecting units 602, 604. A magnetizing current 802 shows a positive DC offset value such that the magnetizing current 802 is shifted to positive values and comprises high magnitude spikes. A value of the minimum detecting unit 602 is indicated by a curve 804, and a value of the maximum detecting unit 604 is indicated by a curve 806. Minimum and maximum reset values 808, 810 coincide and are zero. The minimum detecting unit 602 is reset when the magnetizing current 802 shows a maximum value, and the maximum detecting unit 604 is reset when the magnetizing current 802 shows a minimum value. Before resetting the minimum detecting unit 602 to zero, the minimum detecting unit 602 was capable of properly detecting the minimum value of the magnetizing current 802. However, subsequent to the reset operation, the minimum detecting unit 602 does not properly detect further minimum values. The maximum detecting unit 604 is capable of properly detecting the maximum value of the magnetizing current 802 before and subsequent to the reset operation.

Figure 8B:
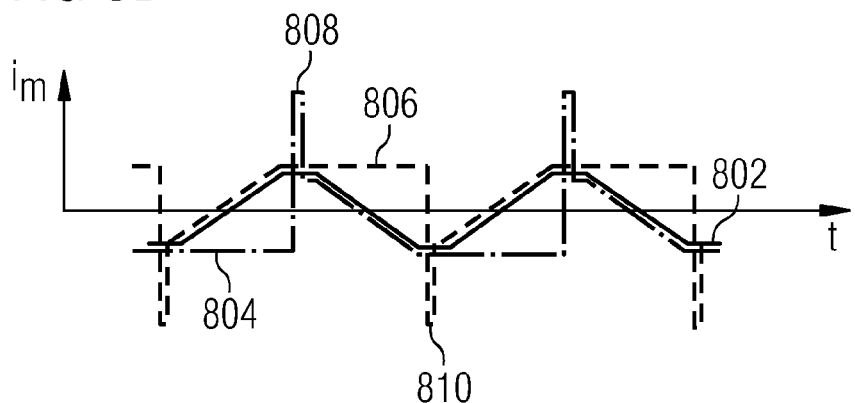
FIG. 8B illustrates a scheme for resetting a magnetizing current to a non-zero value.

FIG. 8B illustrates a sufficient reset of the minimum and maximum detecting units 602, 604. The minimum reset value 808 and the maximum reset value 810 comprise the same magnitude, wherein the minimum reset value 808 is positive and the maximum reset value 810 is negative. Again, the minimum detecting unit 602 is reset upon the magnetizing current 802 showing a maximum value, and the maximum detecting unit 604 is reset upon the magnetizing current 802 showing a minimum value. Due to the reset operation, both the minimum and maximum detecting units 602, 604 are capable of properly detecting minimum and maximum values of the magnetizing current 802.

Figure 9:
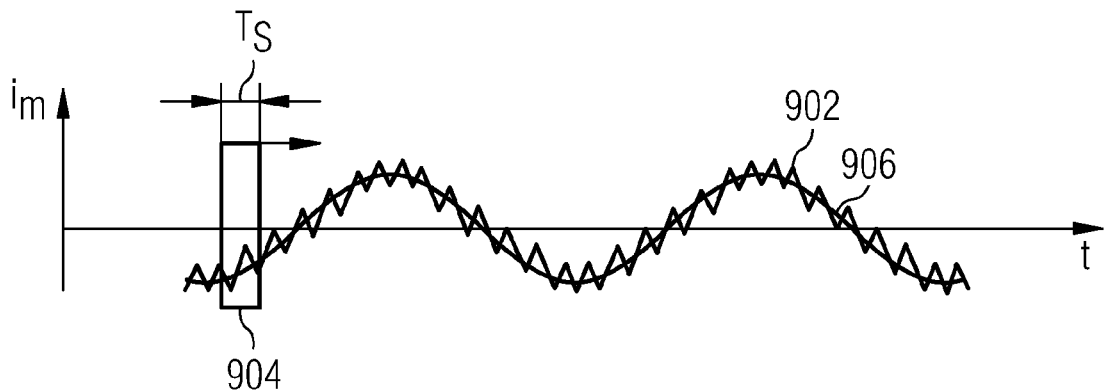
FIG. 9 illustrates a smoothing operation of a magnetizing current.

Referring to FIG. 9, a smoothing operation of a measured magnetizing current 902 may be applied before detecting the minimum value and the maximum value of the magnetizing current 902. Thus, average values of measured points within a time window 904 may be determined such that a smoothed curve 906 is obtained. Therefore background noise of the measured magnetizing current 902 may be less influent.

In the given time window 904 a number of N values of the magnetizing current 902 are measured such that an average value of the measured magnetizing current 902 is calculated as the integral of the time dependent magnetization current normalized to the number N of measured points within the time window 904 and to the sample period $T_s$, i.e. the length of the time window 904. Thus, the averaged magnetization value reads $$i_m = \frac{1}{N*T_s}\int_{N*T_s}^{0} i_m(t)dt.$$

Assuming a switching frequency of 2.5 KHz, the length of the time window 904 is about 10 µs to 20 µs.

The invention claimed is:

1. A saturation control unit for an interphase transforming unit, wherein the interphase transforming unit comprises a primary coil and a secondary coil which are magnetically coupled via a magnetic core member, the saturation control unit comprising:
a minimum detecting unit for detecting a minimum value of a magnetizing current of the interphase transforming unit,
a maximum detecting unit for detecting a maximum value of the magnetizing current,
a saturation estimating unit for estimating an offset value of the magnetizing current, and
a saturation control signal generating unit for generating a saturation control signal for the interphase transforming unit based on the detected minimum value, the detected maximum value, and the estimated offset value.

2. The saturation control unit of claim 1, wherein the saturation estimating unit comprises an integrating unit for outputting an integration value of the magnetizing current.

3. The saturation control unit of claim 2, wherein the saturation estimating unit further comprises a normalizing unit for normalizing the integration value with respect to a length of a cyclic time period.

4. The saturation control unit of claim 3, wherein the saturation estimating unit further comprises a gain unit for gaining a normalized integration value.

5. The saturation control unit of claim 1, further comprising a sampling unit for sampling the saturation control signal and for outputting the sampled saturation control signal.

6. The saturation control unit of claim 1, wherein the minimum detecting unit is adapted to be reset to a minimum reset value and the maximum detecting unit is adapted to be reset to a maximum reset value.

7. A PWM control apparatus for a voltage converting device, the voltage converting device comprising a plurality of voltage converting units being in parallel electrical connection to one another and a plurality of interphase transforming units, wherein each of the interphase transforming units comprises a primary coil and a secondary coil which are magnetically coupled via a magnetic core member, wherein the primary coil of each one of the interphase transforming units is electrically connected to the secondary coil of another one of the interphase transforming units, the PWM control apparatus comprising:
at least one magnetizing current determining unit, wherein each one of the magnetizing current determining units is adapted to determine a magnetizing current of a different one of the interphase transforming units, and
at least one saturation control unit, comprising:
a minimum detecting unit for detecting a minimum value of a magnetizing current of the interphase transforming unit,
a maximum detecting unit for detecting a maximum value of the magnetizing current,
a saturation estimating unit for estimating an offset value of the magnetizing current, and
a saturation control signal generating unit for generating a saturation control signal for the interphase transforming unit based on the detected minimum value, the detected maximum value, and the estimated offset value
wherein each of the at least one of the saturation control unit is adapted to operate on a different one of the magnetizing currents and is adapted to output a saturation control signal for the one of the interphase transforming units.

8. The apparatus of claim 7, wherein one magnetizing current determining unit is provided for one of the interphase transforming units.

9. The apparatus of claim 7, wherein each one of the magnetizing current determining units is adapted to determine a difference current between a current of one of the voltage converting units and a current of another one of the voltage converting units, wherein each one of the saturation control units is adapted to output the saturation control signal for the one of the voltage converting units and the another one of the voltage converting units.

10. The apparatus of claim 7, further comprising a plurality of signal combining units, wherein each one of the signal combining units is adapted to combine a saturation control signal of one of the saturation control units with a saturation control signal of another one of the saturation control units and is adapted to output a combination signal for the one of the interphase transforming units.

11. The apparatus of claim 10, wherein a signal combination of the saturation control signal of one of the saturation control units with a saturation control signal of another one of the saturation control units comprises a signal subtraction.

12. The apparatus of claim 7, further comprising a plurality of comparing units, wherein each one of the comparing units is adapted to compare a reference signal with a different one of the combination signals and to output a comparison signal for the one of the interphase transforming units.

13. The apparatus of claim 7, further comprising a magnitude total load current control unit which is adapted to operate on a magnitude total load current and is adapted to output the magnitude total load current control signal to each of the combining units.

14. The apparatus of claim 13, further comprising a total load current determining unit which is adapted to determine a total load current based on load currents of the voltage converting units and is adapted to output a total load current and a magnitude total load current determining unit which is adapted to determine a difference between a reference total load current and the total load current and is adapted to output the magnitude total load current.

* * * * *